US005142968A

United States Patent [19]

Caron et al.

[11] Patent Number: 5,142,968

[45] Date of Patent: Sep. 1, 1992

[54] AUTOMATED DEEP FAT FRYER

[75] Inventors: Richard N. Caron, Dorchester; David H. McFadden, Lexington; John M. Collins, Ipswich; John Dieckmann, Belmont, all of Mass.

[73] Assignee: Arthur D. Little, Inc., Cambridge, Mass.

[21] Appl. No.: 759,606

[22] Filed: Sep. 13, 1991

Related U.S. Application Data

[63] Continuation of Ser. No. 458,982, Dec. 29, 1989, abandoned.

[51] Int. Cl.[5] ........ A47J 37/00; A47J 37/12

[52] U.S. Cl. ........ 99/404; 99/407; 99/409

[58] Field of Search ........ 99/334, 335, 352, 404, 99/407, 410, 411, 427, 443 C, 403, 405, 416, 330, 355; 221/172; 198/346.2

[56] References Cited

U.S. PATENT DOCUMENTS 2,215,929 9/1940 Husk ........ 99/410 X
3,225,681 12/1965 Wells ........ 99/410 X
3,296,954 1/1967 Haub et al. ........ 99/404
3,357,341 12/1967 Kocken et al. ........ 99/407 X
3,398,672 8/1968 Hoeberigs ........ 99/407
3,448,677 6/1969 Dexters ........ 99/336
3,505,072 4/1970 Rullman ........ 99/407 X
3,535,299 10/1970 Dassesse ........ 260/88.2
3,667,373 6/1972 Sicher et al. ........ 99/407
3,685,432 8/1972 Hoeberigs ........ 99/357
3,818,820 6/1974 Harris et al. ........ 99/407
3,908,531 9/1975 Morley ........ 99/336
3,981,232 9/1976 Williamson ........ 99/337
4,031,820 6/1977 Reed ........ 99/336
4,228,730 10/1980 Schindler et al. ........ 99/329
4,346,649 8/1982 Wilke et al. ........ 99/337
4,356,870 11/1982 Gaylord et al. ........ 169/65
4,478,140 10/1984 Bullock ........ 99/404
4,488,478 12/1984 Leeper ........ 99/330
4,502,373 3/1985 Keating ........ 99/337
4,506,995 3/1985 Polster ........ 374/57
4,567,051 1/1986 Baker et al. ........ 426/438
4,658,709 4/1987 Anderson ........ 99/406
4,685,386 8/1987 Bezon ........ 99/407 X
4,722,267 2/1988 Galockin et al. ........ 99/357
4,732,080 3/1988 Vita ........ 99/407 X
4,748,902 6/1988 Maurantonio ........ 99/407 X
4,751,915 6/1988 Price ........ 126/391
4,821,633 4/1989 Ripatonda ........ 99/407 X

*Primary Examiner*—Timothy F. Simone

[57] ABSTRACT

An automated system for storing and cooking french fried potatoes includes a refrigeration and storage assembly and unique transport system which is easily used with fryers of a commercial type. The transport system includes a horizontal and vertical transport assembly for moving baskets of fries to and from the one or more fryers, with the vertical transport assembly being adapted to lower the basket into the fryer as well as support the basket above the fryer after cooking so as to allow the basket to drain. In accordance with another aspect of the present invention the refrigeration system is such and the strips are oriented all in substantially the same direction before being loaded into a basket so as to enable the fries to be cooked with little or no sticking without requiring the operator to shake the potatoes during or following cooking.

23 Claims, 14 Drawing Sheets

CONTROL 250
REGISTER
252
FRYER
34a
FRYER
34b
FRYER
34a
SHAFT ENCODERS
211
SHAFT ENCODER
181
SWITCH
184a
184b
184c
184d
32a
32n
LOAD SENSOR
124
MOTOR
74
HEATING SYSTEM
122
SOLENOID ASSEMBLY
174
MOTOR
180
MOTORS
210
MOTOR
242
DUMPING MEANS
248

AUTOMATED DEEP FAT FRYER

This is a continuation of copending application Ser. No. 07/458,982 filed on Dec. 29, 1989.

The present invention relates generally to automated fryer systems, and more particularly to a fully automated deep fat fryer system, particularly adapted for cooking french fried potatoes.

Generally, even though fryers are now available for cooking such food stuffs as french fries under computer controlled conditions, the operation used in most fast food chain restaurants uses manual labor to carry out a large part of the operation. In the typical operation, frying baskets are manually filled with pre-cut, partially cooked (parfried) strips of potatoes away from the fryer, and subsequently loaded onto a slack rack. When the operator wishes to cook the potatoes, a basket is manually removed from the slack rack and inserted into the basket lift arm of the fryer. The start button is pressed on the computer controlled fryer, and the basket lift arm lowers the basket into the preheated shortening. About thirty seconds into the cook, the operator usually manually raises the basket slightly and shakes it to breakup strips of potatoes which may be stuck together. At the end of the cook cycle, the baskets are automatically raised by the lift arm out of the shortening. The baskets are then allowed to remain in a position above the fryer so that excess oil will drip back into the fryer. If done correctly the basket is moderately shaken by the operator to remove as much oil as possible, and then manually removed from the lift arm. The french fried potatoes are then manually brought to a holding station, and emptied in the holding station. In the holding station, the fries are manually salted and packaged using a fry scoop. The current practice is to hold the french fries unpackaged for up to 7 minutes and package them to order. Unsalted orders generally require cooking to order. A typical store using two adjacent fryers at a fry station will cook 100 lbs/day, which represents approximately 60–100 baskets of french fries.

Next to food costs, direct labor currently represents the largest operating cost component of this deep fat frying operation, currently accounting for approximately 21% of the total operating cost. Furthermore, fry station workers are becoming increasingly difficult to recruit since the segment of the work force willing to work in the hot, grease-laden environment of fast food restaurants is currently steadily declining, especially in the Northeast portion of the United States.

There is an increased interest therefore in automating deep fat frying operations by automating material handling and production control so as to (1) minimize the impact of crew member shortage, (2) reduce labor cost, occupational hazards and associated liabilities, and (3) improve the fried product consistency.

BACKGROUND OF THE INVENTION

Accordingly, a general object of the present invention is to overcome or substantially reduce the above-noted problems of the prior art.

Another object of the present invention is to fully automate the frying operation of food products such as french fried potatoes.

And another object of the present invention is to provide a fully automated system for storing and making french fried potatoes.

Yet another object of the present invention is to provide a fully automated system for making french fried potatoes without the need to shake the potatoes during and following the cooking of the potatoes.

Still another object of the present invention is to provide a fully automated system for making french fried potatoes including a refrigeration system for storing precooked potatoes at freezing temperatures without sticking together.

And yet another object of the present invention is to provide an improved automated system for making french fried potatoes, compatible with currently available automated deep fat fryers.

And still another object of the present invention is to provide a fully automated system for making french fried potatoes including a system for loading strips of potatoes in such a way so as substantially improve, if not eliminate, the problem of the potatoes sticking together during and following cooking.

It is well recognized by fast food restaurants that fried foods, such as french fries, should not be held for more than some predetermined maximum time period prior to sale since the quality of the cooked food falls below a minimum acceptable level after this time period. In these days, when some argue the existence of a direct relationship between speed of service of fast food restaurants and market share, it is essential to provide the customer with food on demand. This dictates the holding of some foods for varying periods of time. Where full service restaurants have the luxury of cooking foods to order, the fast food industry struggles with customer demand for speed. It is this speed of service that makes cooking to order, especially during slow periods, exceedingly difficult. The goal for the industry, however it may be obtained, should be cooking to order or, at least, minimizing holding of food to every extent possible.

Cooked french fries are not exempt from this goal. The sensory impact of cooked french fries, held over time, changes significantly. As with almost all other prepared food products, cooking to order provides the highest level of food quality and safety. In the preparation of french fries at the retail level, the holding of the cooked product represents one of the two most critical unit operations. The other critical component is the cooking of the potatoes and implications of temperature drop of the cooking oil.

Accordingly, another object of the present invention is to provide an improved automated frying system which is adapted to produce food so as to minimize waste associated with fried food being held beyond the prescribed holding times.

And another object of the present invention is to provide an automated frying system which is capable of operating based on point of sales information and daily business cycles.

These and other objects of the present invention are achieved by a fryer system for cooking foods in oil, the system comprising:

means for defining a loading station;

means, defining a frying station, for receiving fryer means for cooking the foods in the oil;

means for defining a receiving station for receiving the food after it is cooked in the oil;

horizontal transport means for transporting food in predetermined amounts from the loading station to a position above the frying station and from the position above the frying station to the receiving station;

vertical transport means for transporting each of the predetermined amounts of food among a first position wherein each of said predetemined amounts of food is transferable between the horizontal and vertical transport means, a second position wherein each of the predetermined amounts of food is lowered to the frying station so that each of the predetermined amounts of food will cook in the oil, and a third position wherein each of the predetermined amounts of food is positioned above the frying station so as to allow oil to drip into the fryer station after each of the predetermined amounts of food has been cooked in the oil.

In accordance with another aspect of the present invention, a system is provided for loading potatoes cut in elongated strips into a container so that the potatoes can be deep fried in oil to form french fried potatoes without the potatoes sticking together, the system comprising:

a container; and means for loading the strips of potatoes into the container so as to substantially prevent the potatoes from sticking together as they cook in the oil, without the need to shake the container.

In accordance with another aspect of the present invention, a refrigeration system is provided for storing frozen parfried food prior to cooking the food. The system comprises:

means for defining a storage area for storing the food;

first evaporator means, positioned in the storage area, for providing air flow through the storage area at a first predetermined air flow rate;

second evaporator means, positioned in the storage area, for providing air flow to the storage area at a second predetermined air flow rate;

a condensor unit coupled to the first and second evaporator means so as to provide a refrigerant to the first evaporator unit at a predetermined temperature so that the first evaporator means is the coldest surface in the storage area so as to prevent substantial frost build up elsewhere in the storage area, and the air circulation through the storage area is at a second predetermined temperature.

And in accordance with another aspect of the present invention, a system is provided for storing frozen parfried food prior to cooking the food and for moving the food to a loading station where the food can be processed. The system comprises:

hopper means for defining a storage area for storing the food;

means for cooling the storage area so as to maintain the food in the storage area in a frozen state;

means, disposed at a lower position than the loading station, for providing easy access to the storage area so that large amounts of food can be loaded into the storage area without substantial lifting of the food; and vertical transport means for transporting food in the storage area to the loading station.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

BRIEF DESCRIPTION OF THE DRAWINGS

For a fuller understanding of the nature and objects of the present invention, reference should be had to the following detailed description taken in connection with the accompanying drawings wherein.

DETAILED DESCRIPTION OF THE DRAWINGS

Figure 1:
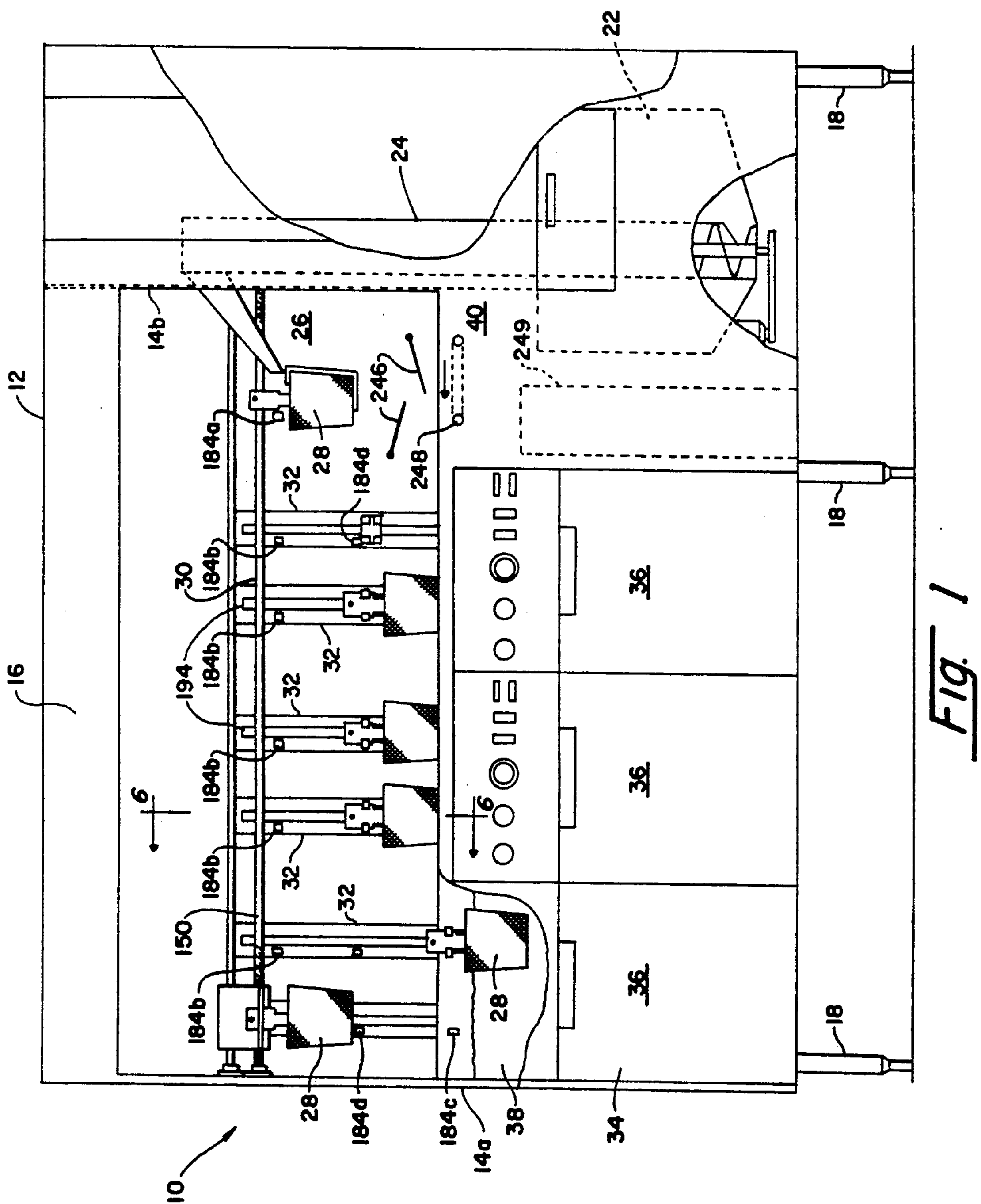
FIG. 1 is a front view, partially cut away, of the preferred embodiment of the automated system constructed in accordance with the principles of the present invention.

In the drawings the same numerals are used to refer to the same or similar parts.

Referring to FIG. 1, the preferred embodiment of the automated fry system 10 includes a framed assembly 12 including side walls 14, a top ventilation hood 16 for housing a ventilation system of a standard type (not shown) and supports 18. The system 10 also includes a storage and refrigeration system 22, a conveying system 24 for conveying food in the form of strips of potatoes from the storage and refrigeration system 22 to a loading station 26. The potatoes are moved from the loading station to a fry basket 28 and, as described in greater detail hereinafter, loaded into the basket 28 in a novel way so as to aid in maintaining the potatoes separate from one another during the cooking process without the necessity of shaking the basket as is the common technique of cooking french fried potatoes currently employed in the prior art. The basket, once filled with potatoes, is moved by a horizontal transport system 30 to a position above the selected frying station 36 where it is transferred to the corresponding vertical transport system 32. The latter is adapted to move the basket among a first position wherein the basket can be transferred between the horizontal and vertical transport systems, a second position wherein the basket is sufficiently submerged for cooking purposes in the hot oil 38 disposed in a fryer 34 at the frying station 36, and a third position wherein the basket is positioned above the oil 38 sufficiently to allow oil to drip from the basket back into the oil.

Once the potatoes are cooked, the vertical and horizontal transport systems 30 and 32 are preferably adapted to transfer the basket back to a position above a holding station 40, wherein means are provided for transferring the cooked potatoes from the basket 28 to the holding station.

Figure 2:
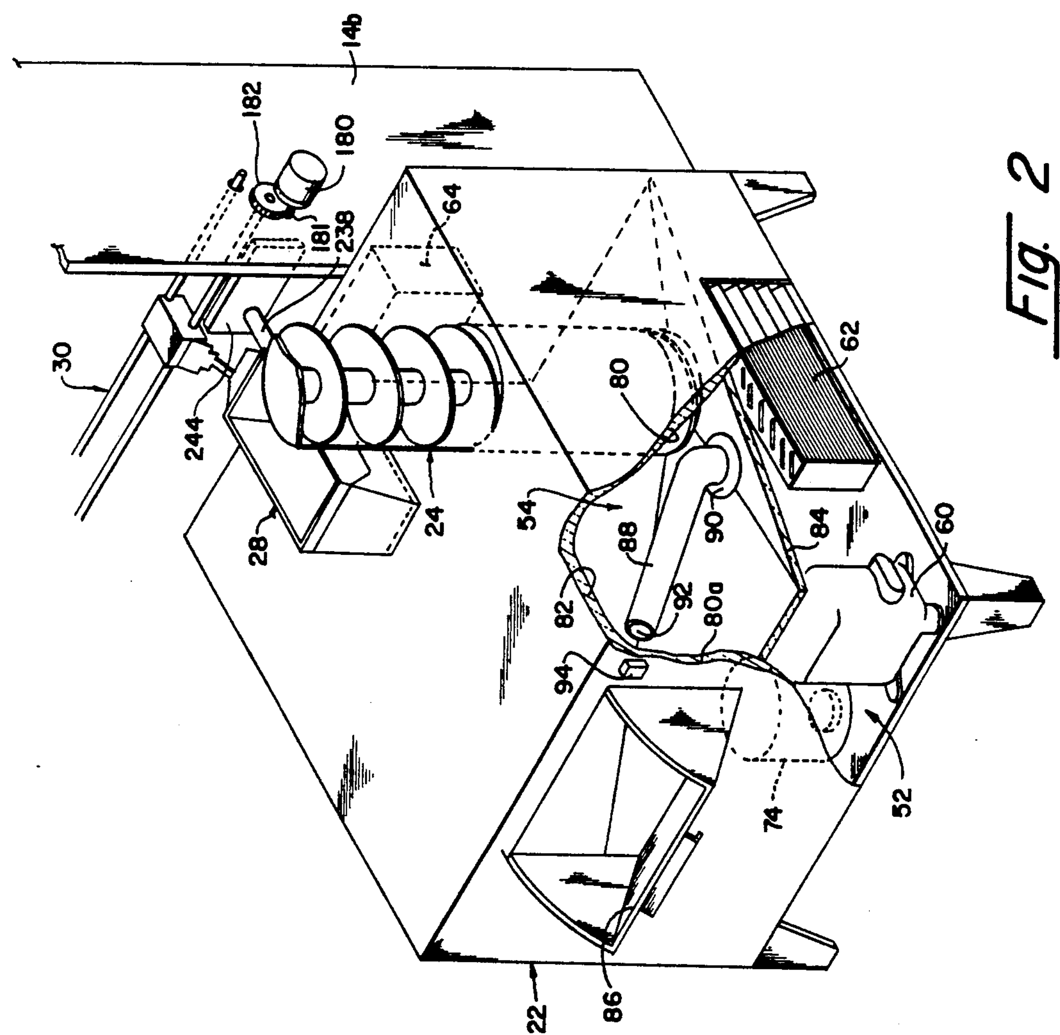
FIG. 2 is a perspective view, partially cut away, of the refrigeration and storage system and loading station of the automated system illustrated in FIG. 1.
Figure 3:
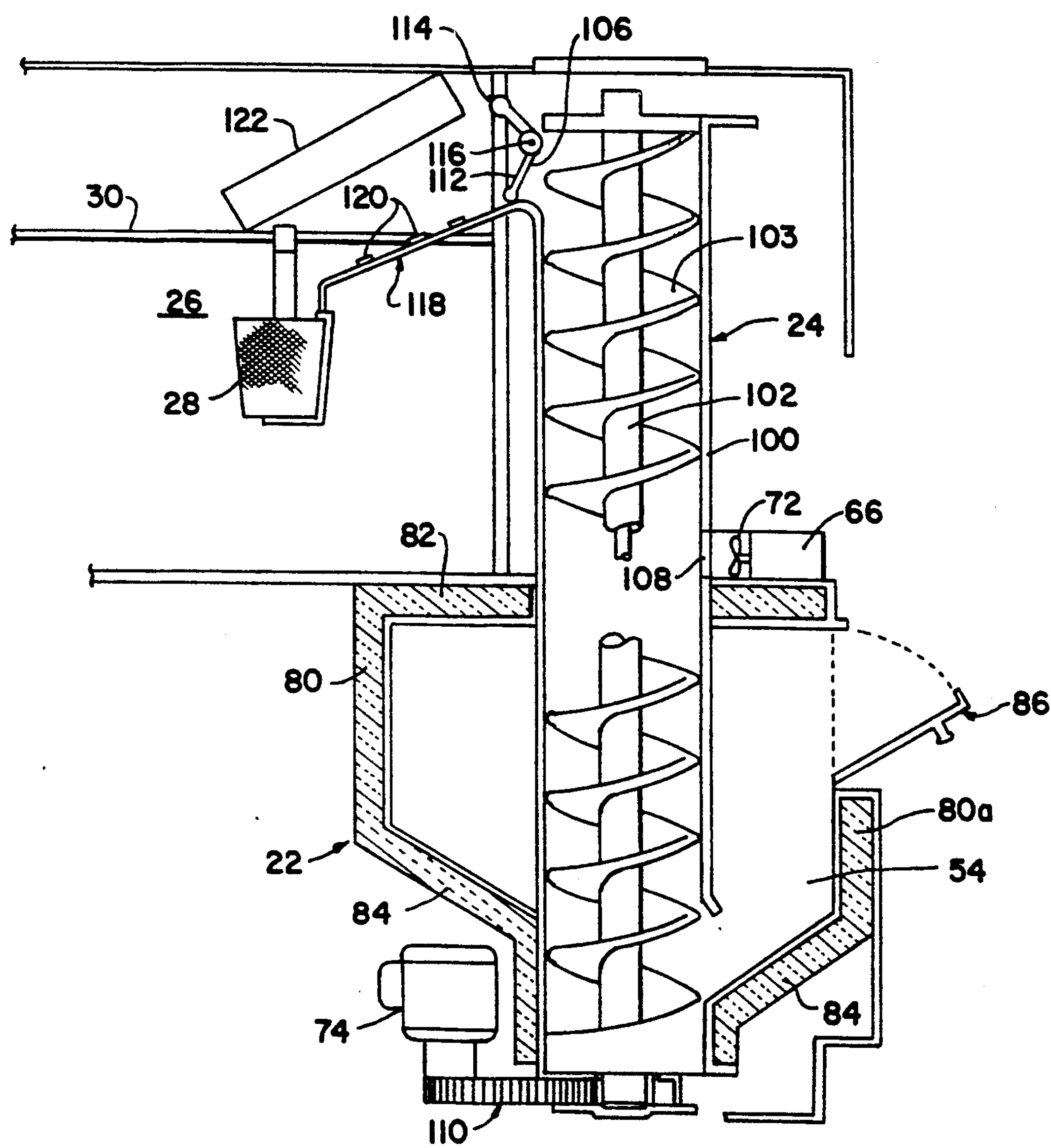
FIG. 3 is a cross-sectional view through the refrigeration and storage system and the loading station of the automated system illustrated in FIG. 1.
Figure 4:
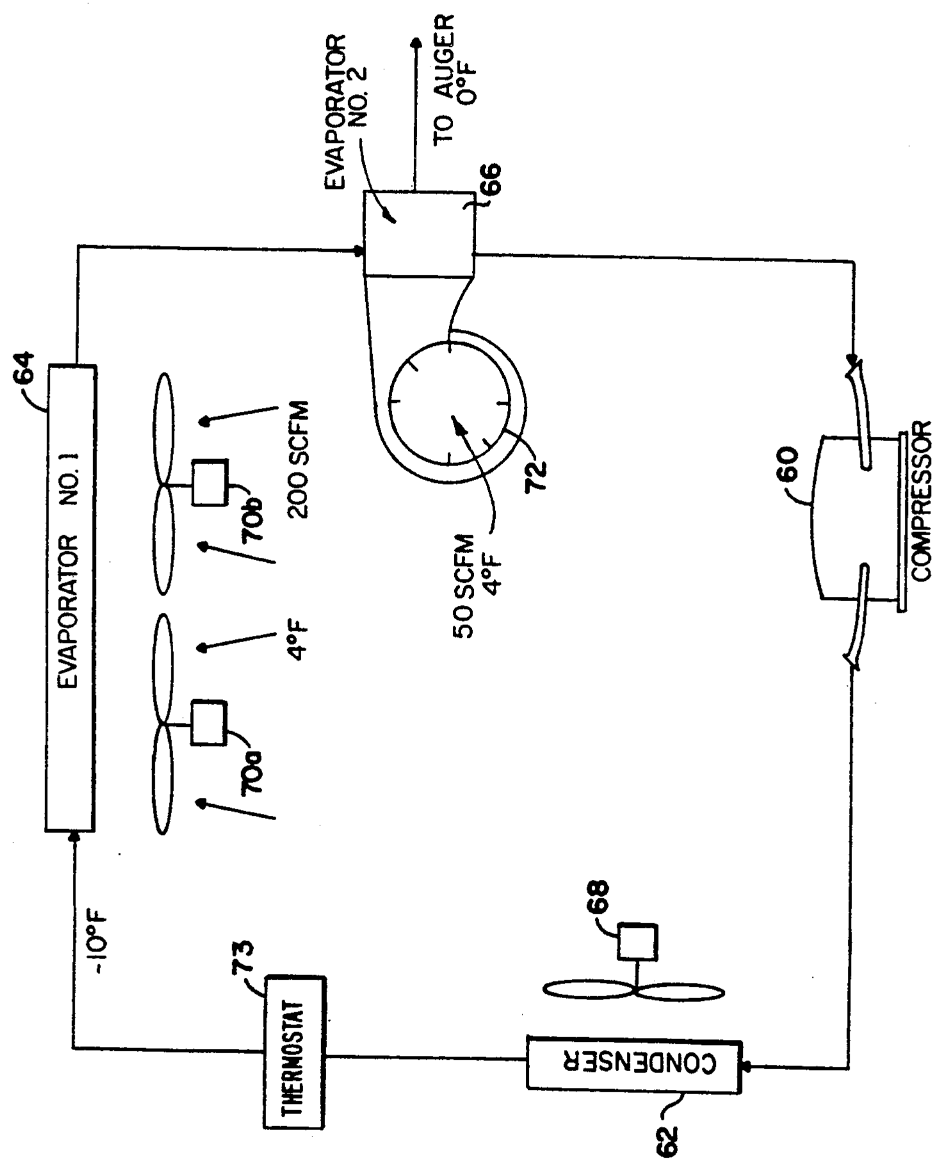
FIG. 4 is a schematic drawing illustrating the refrigeration system used in the automated system of FIG. 1.

Describing the system in greater detail, referring to FIGS. 2-4, the storage and refrigeration system 22 and the conveying system 24 are designed as a compact unit so as to occupy a minimum of space next to existing types of fry stations. The refrigeration and storage system 22 includes a housing 50 having a lower compartment 52 for storing equipment for regulating the temperature and humidity of the upper compartment or hopper 54. The latter compartment is made of heat insulation panels so as to internally maintain the regulated temperature, and is sufficiently large to store a large quantity of food to be cooked, e.g., 160 lbs. of strips of potatoes which is approximately one half of the daily french fry consumption of a typical fast food franchise restaurant.

The lower compartment 52 houses a compressor 60 and condenser coil unit 62 shown in FIGS. 2 and 4. The upper compartment 54 houses a first evaporator unit 64 (shown in FIGS. 2 and 4) for maintaining the temperature within the hopper at a desired level, and a second evaporator unit 66, which is best shown in FIG. 4, for maintaining the temperature within the conveying system 24 at a desired level. Units 62, 64 and 66 respectively include blower fans 68, 70 (70*a* and 70*b*) and 72. As further shown in FIG. 2 the lower compartment also houses a motor 74, preferably a low speed reversible motor, for operating the conveying system 24, described hereinafter. As indicated in FIG. 4 a thermostat 73 controls the temperature within the hopper.

As is well known, frost development within the food service package can easily occur since the temperature of freshly frozen parfried potato strips can vary during packaging and distribution. Further, potatoes stored in conventional refrigeration systems tend to develop additional frost through evaporation and infiltration. Frost development is of concern for two reasons. First, as will be evident hereinafter, the potato strips are metered out of the hopper by the conveying system 24. Frost can cause some of the potatoes to stick together so that metering becomes very difficult if the potatoes are provided in clumps. Further, any water on the potatoes as they are immersed into the hot oil can cause a serious hazard to the personnel in the vicinity of the fryer. The storage and refrigeration system 22 is designed to minimize frost development on the partially cooked strips of potatoes. Once the parfried potatoes are in the hopper 54, correct storage conditions are provided to minimize additional frost development and maintain high food quality. It has been suggested by manufacturers of restaurant refrigeration systems that temperatures in the range of 20° to 25° F., without air circulation, will greatly minimize frost formation of parfried french fries. However, in accordance with one aspect of the present invention it has been discovered that by operating at a slightly lower temperature, e.g., 15° to 20° F., with air circulation, will greatly improve the minimization of frost formation within the hopper 54.

The arrangement shown in FIG. 4 is designed so that water vapor will preferentially condense on the first evaporator unit 64 positioned in the hopper 54. The first evaporator unit 64 is the coldest surface in the hopper, preventing a substantial frost build up elsewhere in the hopper. However, to minimize both the moisture loss from the potatoes and the corresponding rate of frost buildup on the first evaporator unit, a high air circulation rate and a generously sized evaporator unit 64 is utilized, e.g., the evaporator has an input refrigerant from the condensor unit 62 at a temperature of about −10° F. and an air flow of about 200 scfm, so as to provide the 15° to 20° F. air circulation through the hopper.

As seen in FIGS. 2 and 3, the hopper 54 is a complete enclosure with insulated sides, front and back 80 (the front being indicated as 80*a*), an insulated top 82 and an insulated bottom 84. Hopper 54 is provided with a loading door 86 in the front 80*a* which pivots open so that frozen parfried potatoes can be quickly loaded into the hopper. Means are provided for indicating when the potato inventory level within the hopper falls below a minimum desired level so as to provide personnel a signal that more potatoes should be loaded into the hopper. The indicator means can take the form of a pivotable arm 88, shown in FIG. 2, having one end pivotably attached to the inside top portion of the front 80*a* and its other end 90 shaped and adapted to rest on the top of the potato inventory within the hopper. The arm can be provided with a sensor 92 at its pivoting end so as to sense when the arm end 90 falls below a certain level. A signaling device 94, such as a light and/or a buzzer, mounted on the front of the hopper is suitably connected to the sensor and a power source so as to provide an indicator signal to personnel when the hopper needs to be loaded. It should be appreciated that other indicating means can be employed for signaling the need to load additional potatoes into the hopper. For example, ultrasonic level sensors, a light beam source and photoelectric sensor, means for tracking the weight of the hopper, or the provision of an insulated (double or triple glaze) window for directly viewing the contents of the hopper can be utilized.

The bottom 84 of the hopper, which separates the hopper from the lower compartment 52, is formed so that it slopes downwardly toward the center of the floor where the conveying system 24 is positioned to receive strips of potatoes. The slope is sufficient so that potatoes will freely slide under the force of gravity toward the conveying system but not too large so as to significantly reduce the internal volume of the hopper. It is believed that a 20° slope would be sufficient, although a 30° slope is preferable without being excessive.

The conveying system 24 includes the hollow elevator shaft 100 for housing a rotatable elevator in the form of auger 102. The shaft and auger extend from the bottom 84 of the hopper 80 through the top 82 of the hopper to the loading station 26. The bottom of the shaft is provided with an opening 104 for receiving strips of potatoes at the bottom of the auger. The top of the shaft is provided with an opening 106 for transferring strips of potatoes transported by the auger to the loading station 26. The shaft also includes a third opening 108 for receiving cold air from the fan 72 of second evaporator unit 66. In this regard the airflow is at a rate of about 50 scfm and is directed up the shaft so as to keep the potatoes in a frozen state with minimum frost as they are transported up the shaft.

The auger 102 is rotatably mounted at both ends of the shaft and is rotatably driven by the reversible motor 74 preferably through transmission gears 110 as best shown in FIG. 3. The auger rotates so as to transfer potatoes loaded onto the blade 103 of the auger through the bottom opening 104 to the top opening 106. The outer cross-sectional diameter of the blade 103 and the inner cross-sectional diameter of the shaft 100 are sized so that the auger will freely rotate without potatoes falling and/or wedging themselves between the auger blade and shaft wall. The pitch of the blade of the auger 102 is gently inclined so that as potatoes pass through the bottom opening 104 they will come to rest on the blade, frictionally held in place as the auger rotates, and be carried up to the top opening 106.

Figure 5:
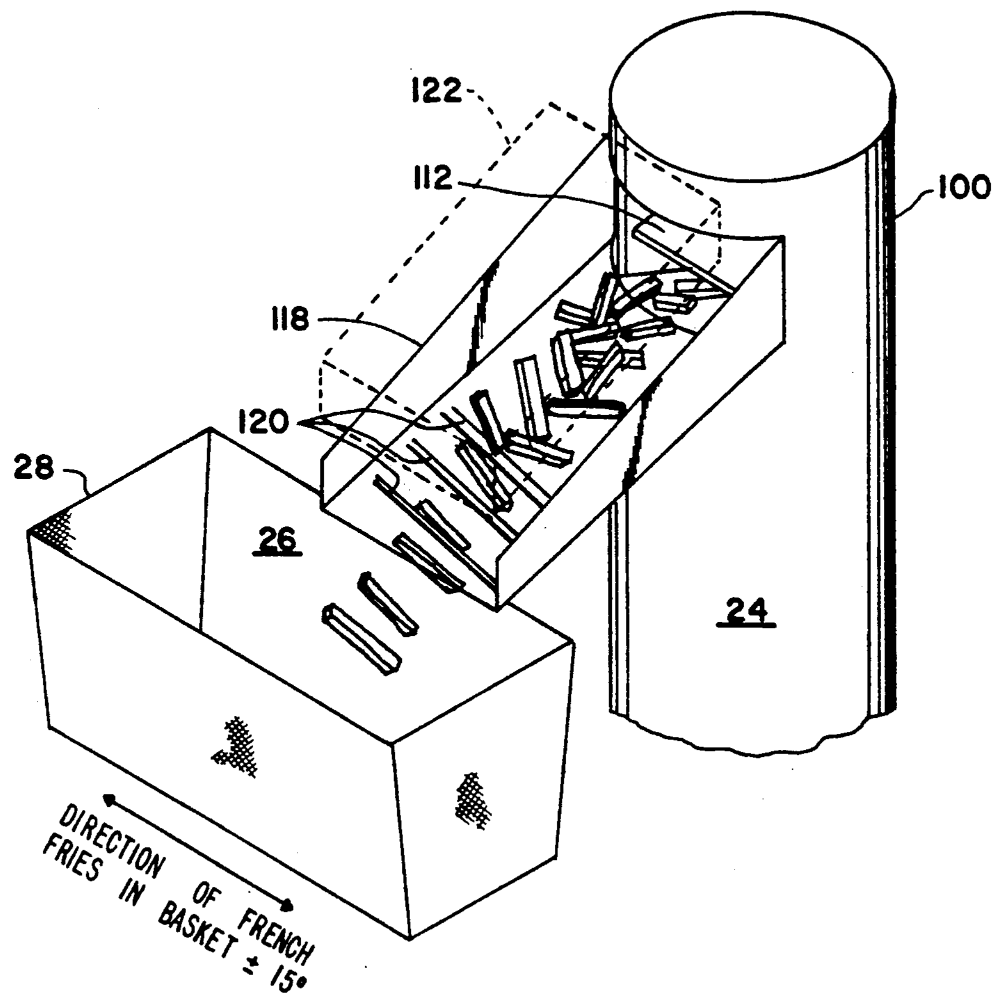
FIG. 5 is a perspective view of the loading station of the automated system of FIG. 1 illustrating the preferred technique of loading strips of potatoes into the individual fry baskets of the automated system.

The top opening 106 of the elevator shaft 100 is provided with a pivotable door 112 which includes a counterweight 114 so as to be balanced about its pivot 116 and which can be opened easily by the force of a single strip of potato falling off the blade of the auger and through the opening 106. As shown in FIGS. 3 and 5, a slide or chute 118 is provided at the opening 106 and inclined so that the strips of potatoes will easily slide down toward a fry basket 28 positioned at the home position of the horizontal transport system 30 so as to receive the potatoes.

In accordance with one aspect of the present invention, means are provided for orienting the potatoes as they are loaded into the basket so as to greatly reduce the chances of the potatoes from sticking together as they cook in the fryer, without the need to shake the basket 28. More specifically, as best shown in FIGS. 3 and 5, the chute 118 is provided with means, in the form of raised parallel ridges 120, which tend to interact with the fries as they fall down the chute so as to orient the potatoes (i.e., the elongated direction of the potatoes) all in substantially the same direction as the ridges before the potatoes fall into the basket. Orienting the strips of potatoes all in substantially in the same direction before they fall into the basket will result in the potatoes all coming to rest within the basket within 15° of their orientation before they fall so that the potatoes will therefore all be oriented in their elongated direction within 30° of each other. It has been empirically determined that if the strips of potatoes are loaded in this manner it will minimize the amount that the potatoes stick together as they cook in the hot oil, and therefore eliminates the need to shake the basket as the potatoes cook.

In order to thaw the potatoes before they are cooked, a source 122 of hot dry air (shown in FIG. 3 and in phantom in FIG. 5) is provided above the home position of the basket. The source 122 blows hot dry air on the potatoes as they travel down the chute toward the basket and on the potatoes already in the basket. In this regard the basket 28 being filled will be held in the home position for a predetermined period of time once it is full before it is moved on the horizontal transport 30 to insure that the potatoes are sufficiently thawed.

The horizontal transport system 30 includes means, cooperative with each basket when the basket is in the home position (shown in FIG. 2, 3, 5, 9 and 10), for measuring the amount of potatoes loaded into the basket from the chute 118. The means, for example, can include a load sensor 124 (seen in FIG. 10), positioned in the bottom of the basket harness 220 (described in greater detail hereinafter with respect to FIGS. 9 and 10), for sensing the weight of the basket and for providing a signal as a function of the weight of the contents of the basket. The sensor 124 can be suitably connected to the reversible motor 74 (as described hereinafter with respect to FIG. 11) so as to stop the motor and the rotation of the auger 102 when the basket is full. If necessary the control provided by the load sensor can be calibrated before the maximum desired load is actually achieved in order to take into account potatoes which are falling from the auger and are on the chute when the load sensor provides its signal to turn the motor 74 off so that these additional, in transit, potatoes falling into the basket after the auger has stopped will not overfill the basket beyond the intended maximum load. If necessary the control for stopping the rotation of the auger can reverse the direction of rotation of the auger by reversing the direction of operation of the motor 74 so as to prevent additional potatoes from falling through the opening onto the chute and therefore minimize the number of potatoes falling into the basket when the sensor 124 indicates a full load.

Figure 6:
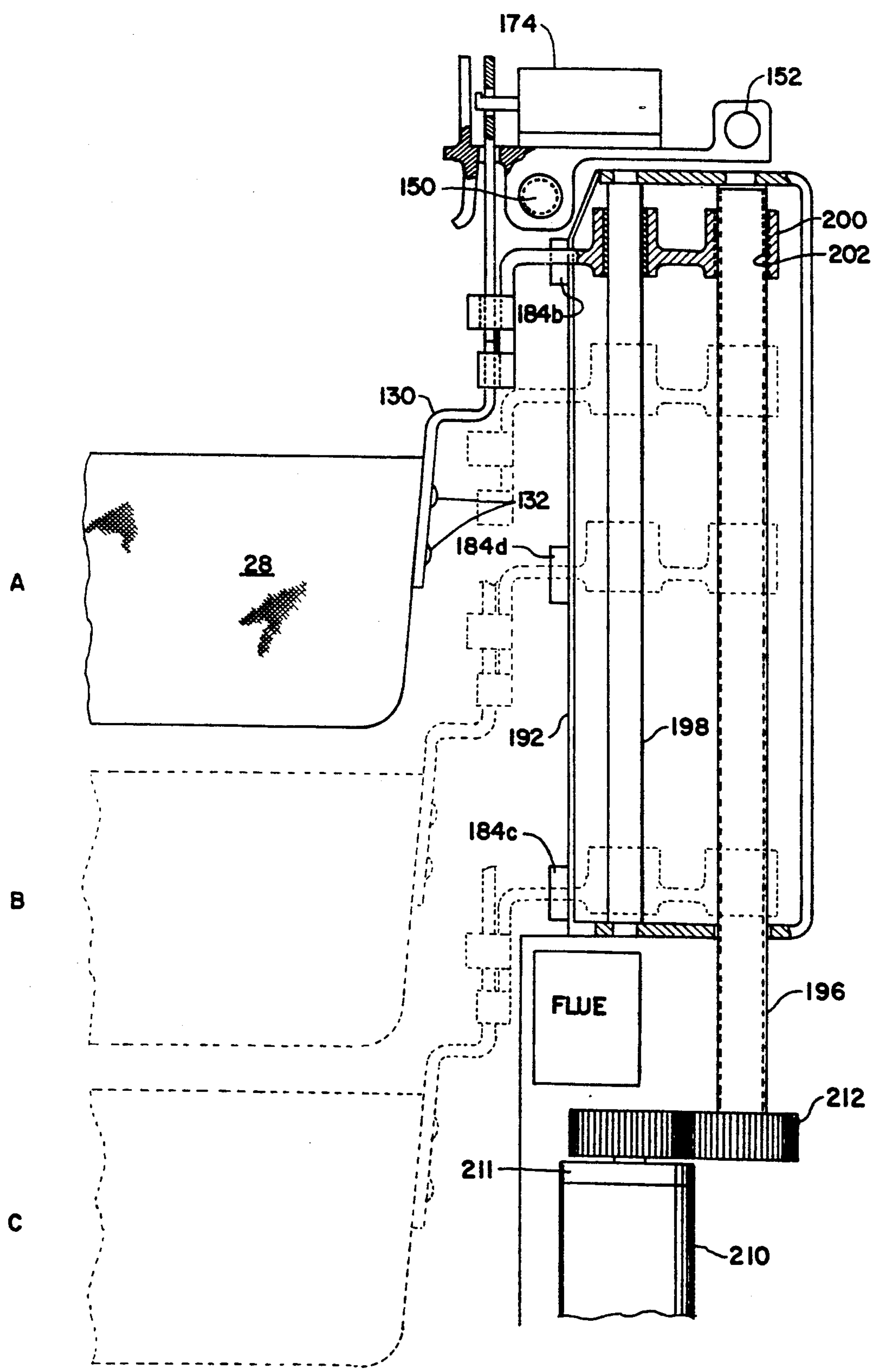
FIG. 6 is a cross-section view taken along line 6—6 in FIG. 1 showing details of the horizontal and vertical fry basket transport of the automated system of FIG. 1.
Figure 7:
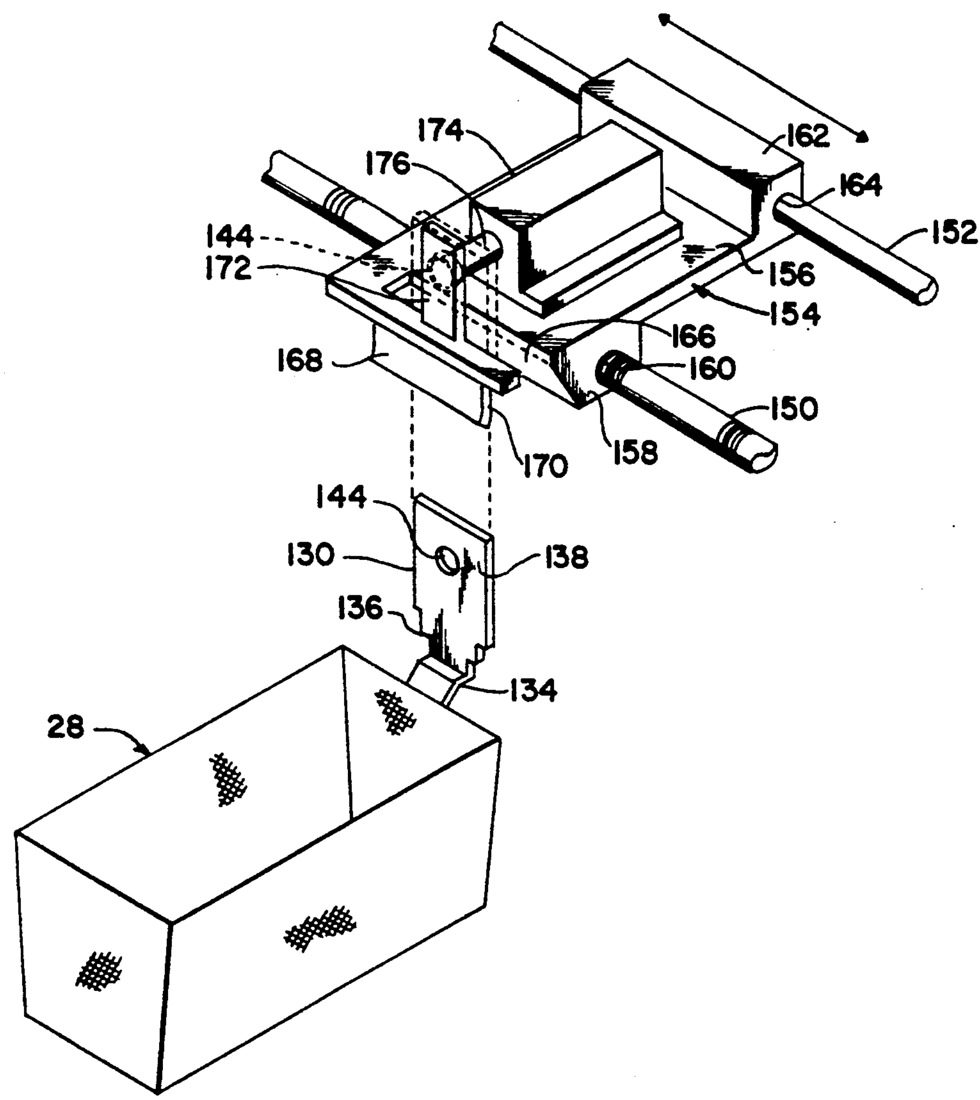
FIG. 7 is a perspective view of the engagement mechanism for securing each fry basket to the horizontal transport of the automated system of FIG. 1.
Figure 8:
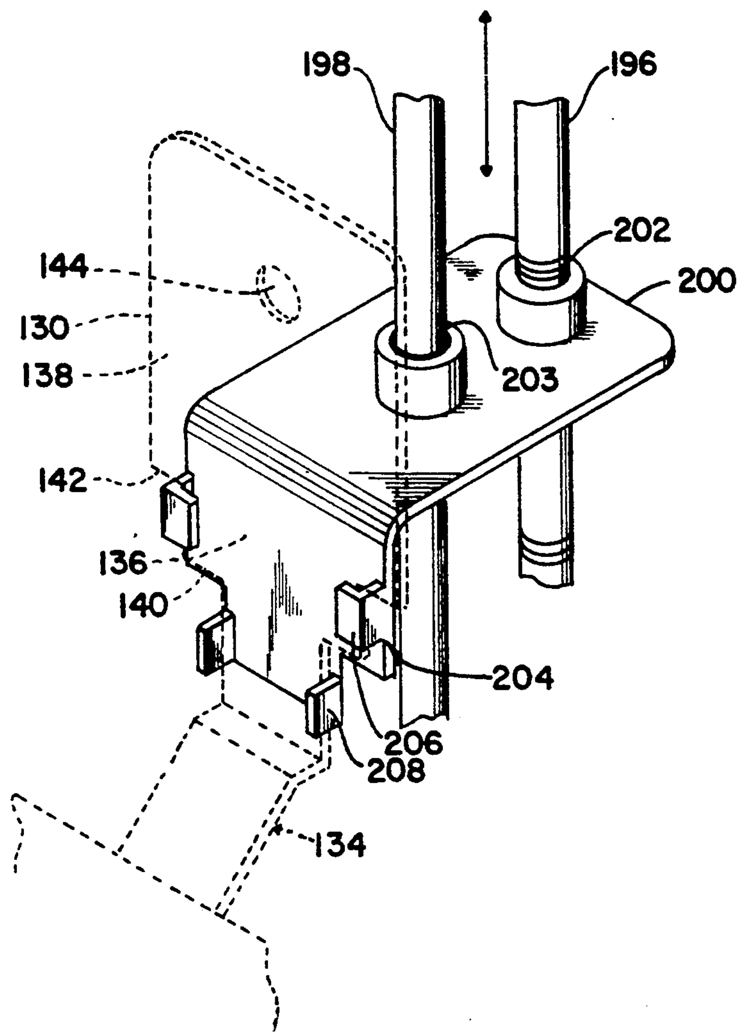
FIG. 8 is a perspective view of the engagement mechanism for securing each fry basket to the vertical transport of the automated system of FIG. 1.

The horizontal transport system 30, vertical transport system 32 and basket 28 are design to cooperate with one another so that the basket can be moved from the home position at the loading station 26 to a position over the frying station 36, moved vertically down into a selected fryer 34, raised above the fryer once the potatoes have cooked in the oil of the fryer so that oil will drain back into the fryer, returned to the horizontal transport system 32 so that the basket 28 can be returned to the home position and the cooked potatoes transferred to the holding station 38 (the latter being described hereinafter). Accordingly, as shown in FIGS. 6–8 the basket 28 includes means, preferably in the form of handle 130, for engaging the horizontal and vertical transport systems so that the basket can be moved in the direction desired. More specifically, the handle 130 is formed by a bracket having one end suitably attached to the end of the basket (with rivets 132 as shown in FIG. 6, or the like) and has a neck section 134, intermediate section 136 and a tab section 138. The tab section 138 is made wider than the intermediate section, while the latter is wider than the neck section 134 so that the edges of the neck section provide horizontal edges 140 between the neck and intermediate sections and horizontal edges 142 between the intermediate section and the tab section, as shown in FIG. 5. An aperture 144 is provided in the tab section 138 for reasons which will become more apparent hereinafter. As described hereinafter, with respect to FIGS. 9 and 10, the basket can also include front and back wire loops 234 so that the basket can be supported in the basket harness 220.

Referring to FIGS. 1, 6 and 7 the horizontal transport system 30 comprises a lead screw 150 **14*a* and 14*b* of the assembly 12 (as shown FIG. 1). A horizontal guide rod 152, shown in FIGS. 6 and 7, is also secured at its opposite ends to the walls 14*a* and 14*b* so that the rod extends in its longitudinal direction parallel to the longitudinal direction of the lead screw 150. Referring to FIGS. 6 and 7, means for engaging the basket handle 130 for supporting the basket from the horizontal transport is provided. The means preferably includes a lead screw follower 154. The follower 154 is mounted on the lead screw 150 and guide rod 152 so that when the screw rotates the follower will move longitudinally along the screw and rod in a direction which is a function of the direction of rotation of the screw. In this regard the guide rod insures the longitudinal movement and helps serve to support the moment created by the basket extending out from the horizontal transport. The means for engaging the handle 130 of the basket 28** also includes means for releasably securing the basket to the horizontal transport system 32.

More specifically, as best shown in FIG. 7, the lead screw follower 154 includes a support plate 156 including (a) a screw receiving portion 158 including a screw threaded hole 160 for receiving the lead screw 50, and (b) a guide rod receiving portion 162 including a hole 164 for receiving the guide rod 152. The plate 156 also includes slot 166 sized so as to receive the tab section 134 of the handle 130 as shown in phantom in FIG. 7 and open on one side (on the side closest to the storage and refrigeration system 22) so that the handle can be moved laterally out of the slot for reasons which will be more apparent hereinafter in connection with the description of FIGS. 9 and 10. A handle guide cuff 168 having a curved surface 170 extends downwardly from the front edge of the plate below the front edge of the slot 166 for guiding the tab section 138 of the handle 130 when the latter is moved up toward the slot 166. A tab 172 extends upwardly from the front edge of the plate above the front edge of the slot 166. A solenoid assembly 74 is secured to the top surface of plate 156 and includes a solenoid piston 176 adapted to extend through the aperture 144 of the handle 130 of each basket 28, toward the tab 172 of the follower 154, when the tab section of the basket handle extends up through the slot 166 of the plate 156 as shown in FIG. 7. In this regard the slot 166 of the plate 156 and the solenoid assembly 174 are positioned relative to the lead screw and guide rod so that when the tab section 138 of the basket handle 130 is secured in place through slot 166 with the solenoid piston 176 extending through the aperture 138 of the handle 130, as the lead screw rotates the basket will move longitudinally between the walls 14*a* and 14*b* without interfering with the lead screw and guide rod.

Means are provided for rotating the lead screw 150 about its longitudinal axis selectively in either direction in predetermined amounts so as to move the lead screw follower 154 (and the basket 28 secured thereto to the positions described hereinafter). The means, shown in FIG. 2, for rotating the lead screw includes a horizontal actuator assembly preferably comprising a reversible motor 180, shaft encoder 181 and gear assembly 182, all supported by the side wall 14*b*. The gear motor 180 and assembly 182 are suitably coupled to the lead screw 150 so that operation of the motor in one direction rotates the lead screw in one direction, while operation of the motor in the other direction rotates the lead screw in the other direction. The gear assembly is designed so that the basket will travel on the horizontal transport assembly at a desired predetermined speed. The shaft encoder 181 provides information as to the location of the follower 154 in a well known manner, based on the number of revolutions of the lead screw 150 and the pitch of the screw. As shown in FIGS. 1 and 6, means, preferably in the form of non-contact Hall-effect sensors 184*a* and 184*b*, are provided at the home position (see sensor 184*a*) so that the system knows when a basket is in position for unloading cooked potatoes and in proper position for loading parfried potatoes into the basket, and at each of the vertical transport assemblies 32 (see sensors 184*b*) so as to insure the proper positioning of the basket on the horizontal transport assembly and a selected vertical transport assembly so as to insure a reliable transfer of a basket between the two assemblies.

As shown in FIG. 1, at least one and preferably a plurality of vertical transport assemblies 32 are provided. One or more vertical transport assemblies can be provided for each fryer 34, with two being shown so that two baskets can be used simultaneously with each fryer. The vertical transport assemblies are designed to operate independently of one another. Details of each vertical assembly are best shown in FIGS. 6 and 8, wherein each vertical transport assembly includes a shield 192 including a vertical slot 194 (see FIG. 1). The shield protects a rotatable lead screw 196 and guide rod 198 (both shown in FIGS. 6 and 8), both vertically positioned within the shield, parallel to one another. The lead screw is secured so as to rotate about its vertical axis as best shown in FIG. 6.

As best shown in FIG. 8, each vertical transport assembly 32 also includes means for engaging the basket 28 so as to secure the basket to the vertical transport. More specifically, the means for engaging the basket includes a vertical lead screw follower 200 having a first hole 202 threaded so as to receive the lead screw 196 and move vertically along the lead screw 196 responsively to the rotation of the latter in a direction which is a function of the direction of angular rotation of the lead screw. Each vertical lead screw follower 200 also includes a second hole 203 adapted to receive the guide rod 198 in a sliding fit so as to insure its vertical movement as the lead screw 196 rotates about its vertical axis and to carry the moment provided by the basket when secured to the follower 200.

As best shown in FIG. 8, the vertical lead screw follower 200 includes means for engaging the basket 30 so as to secure the basket as it is transferred from the horizontal transport assembly, lowered into the fryer 34 and raised from and supported above the fryer. More specifically, the follower 200 includes a latch section 204 extending vertically and including a first pair of fingers 206 formed with a U-shaped cross-section in front of the latch section 204 for receiving the intermediate section 136 of the handle 30 of each basket 28. The spacing between the ends of the fingers 206 is large enough to receive the neck section 134 and small enough to retain the intermediate section 136. The latch section 204 also includes a second pair of fingers 208 extending forwardly from the latch section and spaced so as to receive the neck section 134. As will be evident hereinafter, when the basket is transferred from the horizontal transport assembly 30 to the vertical transport assembly 32, the fingers 206 and 208 are adapted to receive the neck section 132 of the handle 130 as the vertical follower is raised toward the handle and secure the intermediate section 136 between the U-shaped fingers 206 and the neck section 134 between the fingers 208. Specifically, as the basket is supported in its proper position on the horizontal transport assembly 32 (a) the fingers 206 slip over the neck section as the latch section 204 moves up, and slips onto the intermediate section 136 so as to engage the horizontal edges 142 between the intermediate and tab sections 136 and 138, with the intermediate section 136 being restrained by the fingers 206, and (b) the fingers 208 receive the neck section 134 and engage the horizontal edges 140 between the neck and intermediate sections 134 and 136.

Each vertical transport assembly also includes means for rotating the lead screw 196 about its vertical axis selectively in either direction for a predetermined amount so as to move the lead screw follower 200 in a vertical direction. Means for rotating the lead screw, shown in FIG. 6, preferably includes a vertical actuator preferably comprising a reversible stepping motor 210, shaft encoder 211 and gear assembly 212. The reversible stepping motor 210 controls the direction of rotation of the lead screw so as to control the direction of movement of the follower 200. The gear assembly is designed so that a basket, secured to the follower 200, will move at a predetermined speed. The shaft encoder 211 will provide information about the position of the follower 200 based upon the number of rotations of the lead screw 196 and the pitch of the lead screw in a well known manner.

As will be more evident hereinafter each vertical transport assembly is designed to move a basket among three positions as shown in FIGS. 1 and 6. The first position, indicated at A in FIG. 6, is where the basket 28 is transferable between the horizontal and vertical transport assemblies. The second position, indicated in phantom at B in FIG. 6, is where the basket 28 is lowered into a fryer 34 at the fry station 36 so that the contents of the basket can be cooked in hot oil. The third position, indicated in phantom at C in FIG. 6, and preferably between the first and second positions, is where the basket 28 is positioned above the fryer at station 36 so as to allow oil to drip into the fryer after food in the container has been cooked in the hot oil. Means, preferably in the form of non-contact hall sensors **184*b*, 184*c* and 184*d* are also provided at the first, second and third positions for cooperating with the follower 200** (or the basket) for indicating when the basket is in each of the corresponding positions A, B and C. The A, B and C positions are chosen so as to provide the minimum necessary movement of the basket. For example, for the nominal six inch deep basket, the extent of vertical lift between positions A and B is approximately fourteen inches, where the basket is lifted seven inches from position B to position C, and another seven inches from position C to position A.

The actual speed of each of the horizontal and vertical transport assemblies as determined by the motors 180 and 210 and the corresponding gear assemblies 182 and 212 must be slow enough in order to minimize the potential danger of the basket running into personnel in the area (as well as splashing oil when the basket is immersed in the hot oil as it is moved to position B), while fast enough to provide substantial throughput. In this regard, where the horizontal transport is designed to move a basket approximately four feet between the home position and the farthest vertical transport assembly, acceptable average speeds range from approximately 4 inches/second for 100 lb/hr throughput, to 7 inches/second for 150 lb/hr throughput, where the three fryer, two basket per fryer, fry station is used. Further, the accuracy of each of the Hall-effect sensors 184 for the vertical and horizontal transport assemblies is such that positional accuracy is within +/−0.125 inches in order to insure reliable basket hand-off between the two transport assemblies.

The fryers 34 are each of a type which are commercially available and include computerized systems for controlling the temperature of the cooking oil and the cooking time of the potatoes within a basket, as the basket is dropped into the oil. As will be more evident hereinafter with respect to FIGS. 11 and 12, the computerized system of the fryer is connected to the control system of the automated fry system as described in greater detail hereinafter. Each of the fryers can be, for example, the MJH-50 frypot manufactured by Frymaster of Shreveport, Louisiana, or the commercial equivalent, equipped with a computerized system, modified to provide output signals to the control of the system 10 so as to provide cooking information to the latter.

Once the potatoes are cooked in the oil, raised to position C to drain and then transferred back to the horizontal transport 30, the basket is returned by the horizontal transport to the home position so that the potatoes can be transferred to the holding station 38. Accordingly, means are provided for transferring the cooked contents of the basket to the holding station. Preferably, the means includes a basket harness 220 shown in FIGS. 2, 9 and 10 and positioned so as to receive the basket as the latter is moved into the home position. The harness is of a C-shaped, cross-sectional construction preferably comprising a bottom plate 222, a pair of front and back L-shaped brackets 224 and 226 and a back plate 228, all preferably formed from a single sheet of material. The L-shaped brackets 224 each include a slanted side portion 230 and an upper portion 232, extending from the top of the side portion, parallel to the bottom plate 222. The front and back L-shaped brackets cooperate with the bottom plate for snugly receiving the basket as the latter is moved into the home position. In order to ensure that the basket is properly positioned, the receiving edge of the upper portion 232 of each bracket can be curved upwardly while the receiving edge of the bottom plate can be curved downwardly. The upper portions 232 of the corresponding L-shaped brackets are shaped so that they will not obstruct the open top of the basket. In this regard the basket can be provided with front and back wire loops 234 respectively extending from the front and back edges of the basket so that the upper portions of the L-shaped brackets extend over the wire loops beyond the top opening of the basket.

Figure 9:
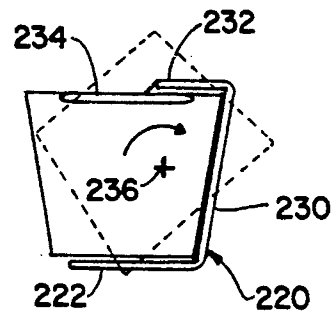
FIG. 9 is an side view of the fry basket mechanism for transferring cooked fries from the basket to the holding station of the automated system of FIG. 1.
Figure 10:
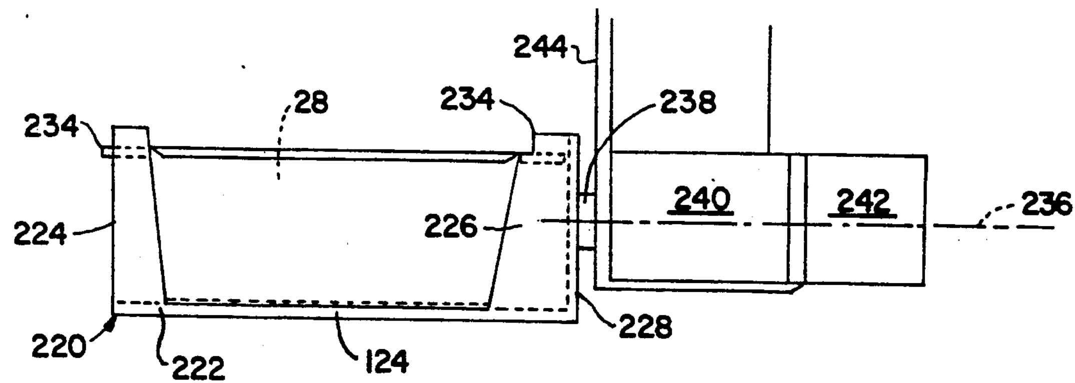
FIG. 10 is a side view of the fry basket and basket harness at the holding station illustrating how fries can be dumped.

Means are provided for rotating the basket about a rotation axis 236, shown in FIG. 10, extending in the longitudinal direction of the basket. The non-contact Hall-effect sensor **184*a* senses when the basket is properly positioned in the harness. The load sensor 24 provides an indication whether the basket received is empty, or contains cooked french fried potatoes. In order to mechanically rotate the harness in response to the sensing of a full basket in the harness, the back plate 228 of the harness is connected to the rotation shaft 238, which in turn is connected through bearings 240 to a reversible motor 242, the bearings and motor being supported by a bracket 244 secured for example to the wall 14*b* as shown in FIG. 2. The motor 42 is designed to be energized in response to the load sensor 124 when the latter indicates the presence of cooked fries so as to initially rotate shaft 238 and harness 220 (and the basket secured in the harness) about the axis 236 in a clockwise direction, as shown in FIG. 9, a sufficient amount, e.g., approximately 135°, so that all of the cooked potatoes fall toward the holding station 38. It should be appreciated that once the basket is securely positioned in the harness as determined by the state of the sensor 184*a*, the solenoid assembly 174 of the horizontal transport assembly 30 can be de-energized so as to release the handle 130 so that the handle can laterally rotate out of the slot 166, and therefore free itself of the horizontal transport assembly. The basket can be held in the rotated position momentarily so as to ensure that all of the potatoes fall from the basket. In this regard baffles 246 (as shown in FIG. 1) can be used to break the fall of the fries as they fall toward the holding station. Once the potatoes are dumped, the motor 242 is designed to be operated in reverse so as to rotate the basket in a counterclockwise direction as shown in FIG. 10 so as to return the harness, and thus the basket, to the proper position wherein the handle 130 of the basket 28 is properly positioned in the slot 166. Once in this position the solenoid assembly 174 can be energized to secure the basket to the horizontal transport assembly so that basket is ready to receive the next load of parfried potatoes from the hopper 54**.

The holding station 40 receiving the cooked fries can be a conventional holding station including a stainless steel grille provided with slots so as to allow for the drainage of any additional oil to drip to a drain pan below the grille and to allow the food to breath. As best shown in FIG. 1, the holding station, however, preferably also includes means, indicated at 248, for dumping the fries into the trash 249 after a predetermined period of time after being held in the holding station. The means for dumping the fries into the trash can include a motor driven rotating belt (as shown in FIG. 1) having slots formed therein to allow the fries to drain and breath.

Figure 11:
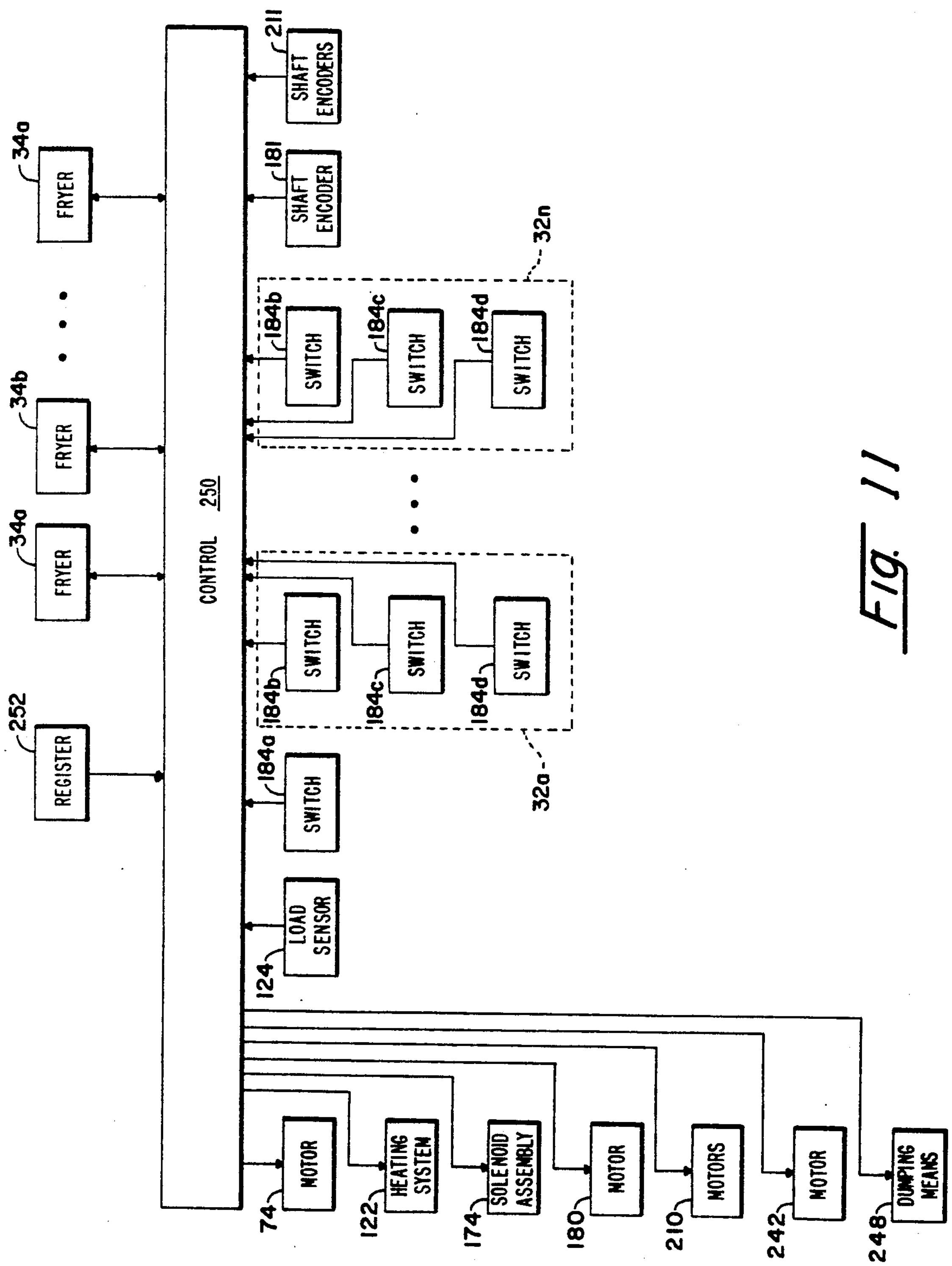
FIG. 11 is a block diagram of the electrical control system for operating the system of FIGS. 1-10.

FIG. 11 is a block diagram of the electrical control system for operating the system of FIGS. 1-10. As shown the control system includes a master control 250, which can include a dedicated microprocessor programmed to carry out the operation steps described hereinafter. The control includes the necessary clock and timers to carry out the control functions described in connection with FIGS. 12A-12D. The control is suitably connected to the motor 74, heating system 122, solenoid assembly 174, motor 180, motors 210, motor 242 and the dumping means 248 in a manner which will be evident in the art. Similarly, the control is connected to receive signals indicative of the weight sensed by load sensor 124, and the state of switch **184*a*, and each of the switches 184*b*, 184*c* and 184*d* of each vertical transport assembly 32, the position of follower 154 from the shaft encoder 181 and the position of each of the followers 200 from the corresponding shaft encoders 211, all in a well known manner. In addition, the control 250 is adapted to receive signals from a remote register 252, where personnel selling food are positioned, as well as the cooking information from each of the fryers 34**, specifically when the fries are completely cooked and ready to be pulled from the hot oil.

Figure 12A:
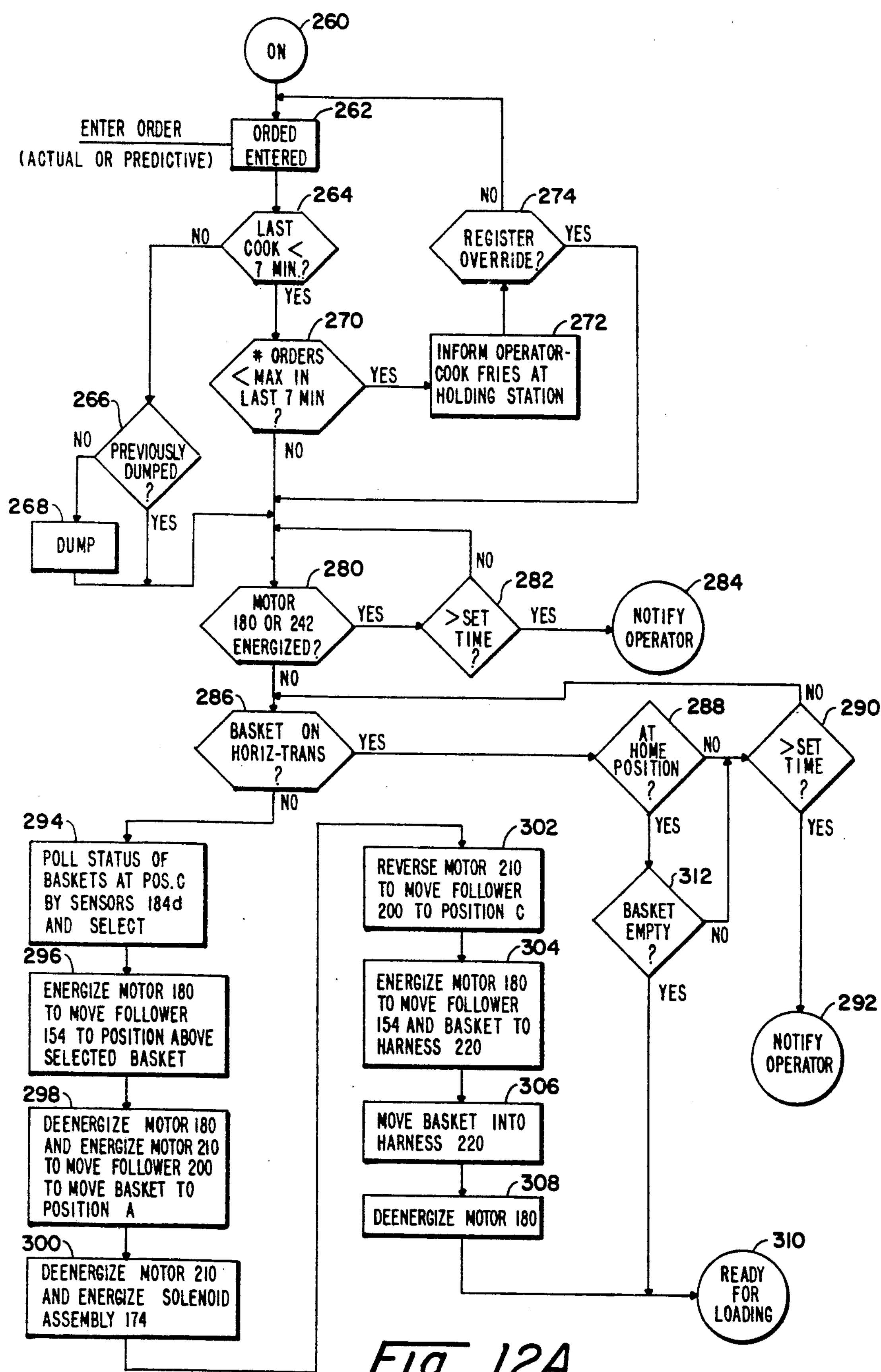
FIGS. 12A-12D combine to illustrate a flow chart of the operation of the system of FIGS. 1-11.

FIGS. 12A-12D combine to illustrate a flow chart of the operation of the system of FIGS. 1-11. Referring to FIG. 12A, the control system is made operational as indicated at 260, for example by turning on the register 252. The latter can provide an ON signal to the control 250 so that the system will remain on until the register is turned off. The commands to the control system, provided at step 262, can be provided directly from the register 250 on a per order basis, and/or the control 250 can be pre-programmed to provide orders on a predictive basis as predetermined by prior studies of the daily business cycles of the particular restaurant within which the system 10 is being used. The pre-programmed information can, for example, be entered into the control 250 through the register 252. Once an order is provided at step 262, the control 250 checks an internal timer at step 264 to determine whether the last fries cooked and received at the holding station 40 were cooked less than the preferred holding time, e.g., 7 minutes. If greater than the preferred holding time and the fries have not been previously dumped as determined at step 266, the fries are dumped at step 268 by operating the dumping means 248 provided at the holding station 40. If at step 264 the last cook fries have been cooked less than the predetermined time the system proceeds to step 270 where the control determines whether the number of orders entered exceeds the maximum number of orders available at the station 40. In this regard, control 250 will include a running inventory of the amount of fries cooked and transferred to the holding station, and the number of orders which have been entered and are presently being prepared. If yes, then sufficient fresh fries are still at the station 40 in order to fill the current orders and the operator is informed at step 272. The operator is then asked at step 274 whether he or she wishes to override the information and make a fresh batch of fries. If not, the program returns to step 260 awaiting for the next order at step 262. On the other hand should the operator indicate an override at step 274, or a determination that fries have been previously dumped at step 266, or fries have been dumped at step 268, or a determination is made that all the fries at holding station 40 have been accounted for based on previous orders, the program continues at step 280 so as to make additional fries.

At step 280, control 250 checks to see if either motor 180 or motor 242 is currently energized, indicating that the horizontal transport 30, or a basket at the home position is being turned to dump cooked fries at the home position. If the inquiry is in the affirmative, at step 282 the amount of elapsed time on a timer which is started each time the motor 180 or 242 is energized (and reset each time each motor is de-energized) is compared to a preset time to be sure that there is no problem with the system. If this preset time is exceeded the control proceeds to step 284 and notifies the operator at register 252 that there is trouble. So long as the preset time is not exceeded, the program repeats steps 280 and 282 until neither motor is energized, at which time the control proceeds to step 286.

At step 286, the control determines whether a basket is on the horizontal transport assembly 30 by checking the status of solenoid assembly 174 and the switches **184*b*. If yes, the control proceeds to step 288 to determine whether the basket is at the home position by checking the status of sensor 184*a*. If no, the basket is most likely being transferred to a vertical transport assembly since the motor 180 has been de-energized as determined at step 280. The control accordingly includes a timer, initiated when the motor 180 is energized when transferring a basket from the home position to the vertical transport assemblies 32 and de-energized when the basket is completely transferred to a vertical transport assembly. The elapsed time in this counter is compared to a predetermined set time at step 290. If the predetermined set time is exceeded the operator is notified at step 292. If however, the predetermined set time is not exceeded, the control returns to step 286 and repeats step 286. So long as the predetermined time is not exceeded, steps 286 and 288 are repeated until the inquiry at step 286 is negative, or the inquiry at step 288** is positive.

In the first instance when the inquiry at step 286 is negative, the control will carry out steps 294-310, while in the second instance when the inquiry at step 188 is positive the control proceeds to step 312.

More specifically, when the inquiry at step 286 indicates that a basket is not on the horizontal transport 30, the control proceeds at step 294 to poll the status of the baskets at position C by interrogating the sensors 184*d* and selects the next basket to be used. The control keeps track of the sequence of the baskets (associated with corresponding vertical transport assemblies) as they are used so that the baskets are chosen so as to tend to average out the use of the fryers 34. Thus, the basket chosen from the poll will be the basket which has been the least frequently used based upon a bookkeeping function carried out by the control.

Having selected the basket, the shaft encoder 181 will indicate the location of the follower 154, and if the follower needs to be moved it is moved by motor 180 to move the follower to its proper position above the basket of choice as indicated at step 296. Once in position as determined by the shaft encoder 181, at step 298 the motor 180 is de-energized, and the appropriate motor 210 is energized to move the basket (located at position C) to the position A. This allows the handle 130 to slip into the slot 166 of the follower 154. At step 300 the motor 210 is then de-energized and the solenoid assembly 174 is energized so that the solenoid piston 176 extends into the aperture 144 of the handle 130 of the basket. At step 302 the motor 210 is reversed so that the follower 200 is moved back to position C as determined by the shaft encoder 211. The motor 180 is then energized at step 304 to move the follower 154 and basket attached thereto to the harness 220. At step 306 the basket is moved into harness 220 at the loading station 26 as sensed by the sensor 184*a* so that once sensed the motor 180 is de-energized as indicated at step 308. The basket in the harness is now ready for loading from the conveying system 24.

Alternatively, at step 288 if the basket is sensed by sensor 184*a* to be already at the home position the control will determine at step 312 whether the basket is empty by sensing the signal from the sensor 124. If the basket is not empty it is either ready to be dumped or is about to be moved on the horizontal transport to a vertical transport assembly. The control will therefore return to step 290 and continue as previously indicated. If at step 290 the control returns to the sequence of steps 286, 288 and 312, and at the latter step the basket is now indicated as empty the control will proceed to step 310 for loading potatoes into the basket.

Figure 12B:
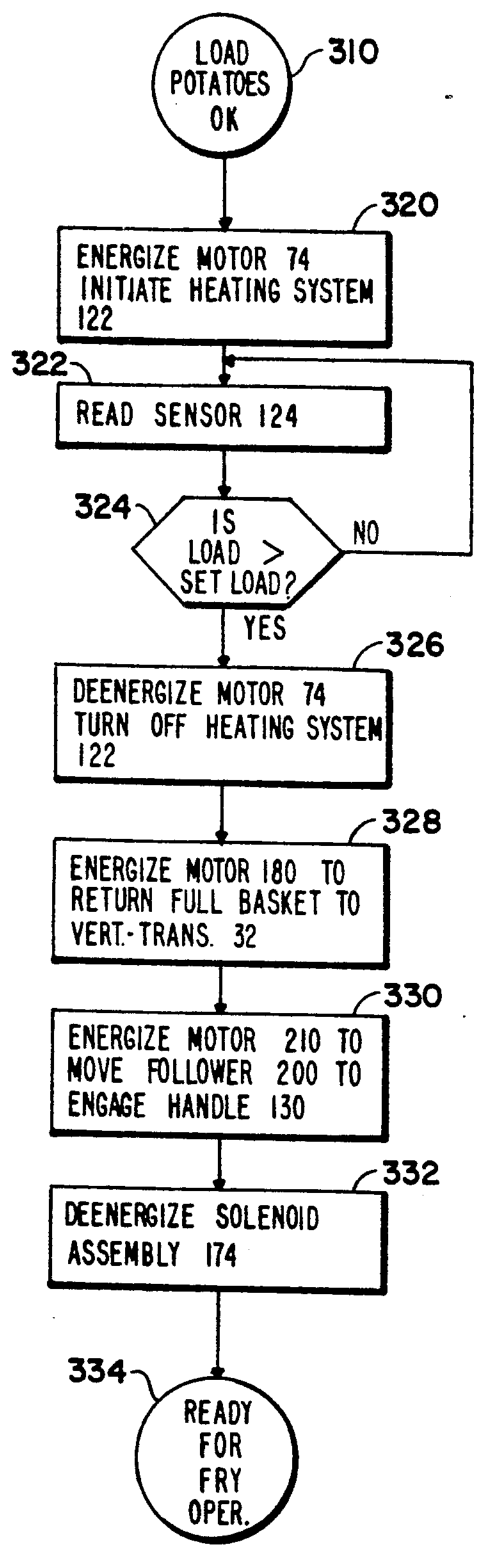

Referring to FIG. 12B, from step 310 the control proceeds to step 320 so that the motor 74 of the conveying system 24 is energized at step 322 so as to move fries from the storage and refrigeration system 22 to the loading station 26. As fries are loaded into the basket the heating system 122 is turned on by the control 250 and remains on so as to thaw the potatoes in the basket 28. At step 324, the sensor 124 is interrogated to determine whether the predetermined load has been exceeded. If not the system continually repeats steps 322 and 324 until the load is exceeded. When exceeded the control will proceed from step 324 to step 326. The motor 74 will then be de-energized (or energized in a reverse direction for a brief moment to minimize additional strips of potatoes falling down the chute 118 into the basket at the home position) and the heating system 122 is turned off (preferably after a predetermined set time following the initiation of the step 326). The basket is now full and the potatoes are substantially thawed so that the potatoes are ready to be cooked. Accordingly, at step 328 the motor 180 is energized so as to return the full basket to the appropriate vertical transport assembly 32 from which the basket originated. The motor 210 is then energized at step 330 so as to move the follower 200 to engage handle 130 of the basket supported by the horizontal transport assembly 30. Once the handle is secured by the follower 200 of the vertical transport assembly 32 as determined by the shaft encoder 211 the solenoid assembly 174 is de-energized at step 332 so as to release the basket from the horizontal transport assembly 30. The basket is now secured to the vertical transport assembly and ready for the frying operation as indicated at step 334.

Figure 12C:
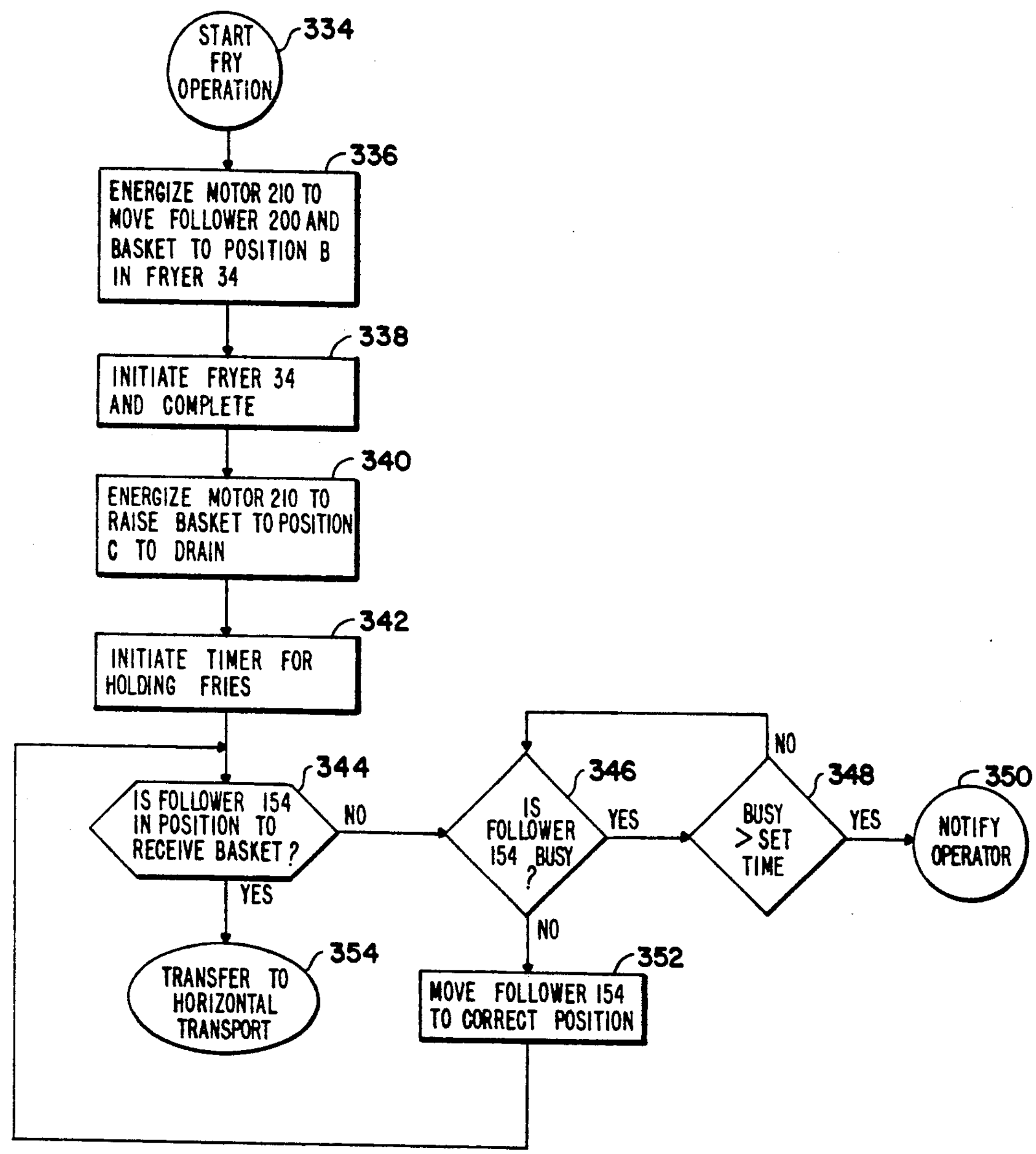

Referring to FIG. 12C, the system proceeds to step 336, whereupon the appropriate motor 210 of the vertical transport assembly supporting the basket of uncooked fries will now be energized and the follower 200 and supported basket will be lowered to the position B in the appropriate fryer 34. Control 250 will now initiate a fry operation by providing an initiation signal to the appropriate fryer 34 as indicated at step 338. As previously described, the fryer is of a type commercially available so as to automatically fry the fries for an amount of time as a function of the temperature of the oil in the fryer. Once the fry operation is completed the fryer provides a signal to the control 250, which in turn proceeds to step 340 so as to energize motor 210 to raise the basket out of the fryer to the position C, where the basket is allowed to rest for a predetermined period of time, e.g., six seconds, so as to allow the fries to drain as indicated by step 342. At step 344, the control inquires whether the follower 154 is in a position above the basket to receive the basket at position C. If not, at step 346 the control determines whether the follower is busy by checking whether the motor 180 is operating and checking the position of the follower 154 by reading the shaft encoder 181. If the follower is busy the length of time that it has been busy is check against a predetermined set time at step 348. If the time has been exceeded, the operator is notified at step 350. If not, so long as the predetermined time period is not exceeded as soon as the follower comes to rest and is no longer in use the control proceeds to step 352 and the follower 154 is moved to the correct position. The control 250 then repeats step 344. The follower should now be in the correct position so that the control is at step 354 as indicated in the drawing where the basket is ready to be transferred to the horizontal transport assembly and moved back to the home position so that the cooked fries can be unloaded at the home position.

Figure 12D:
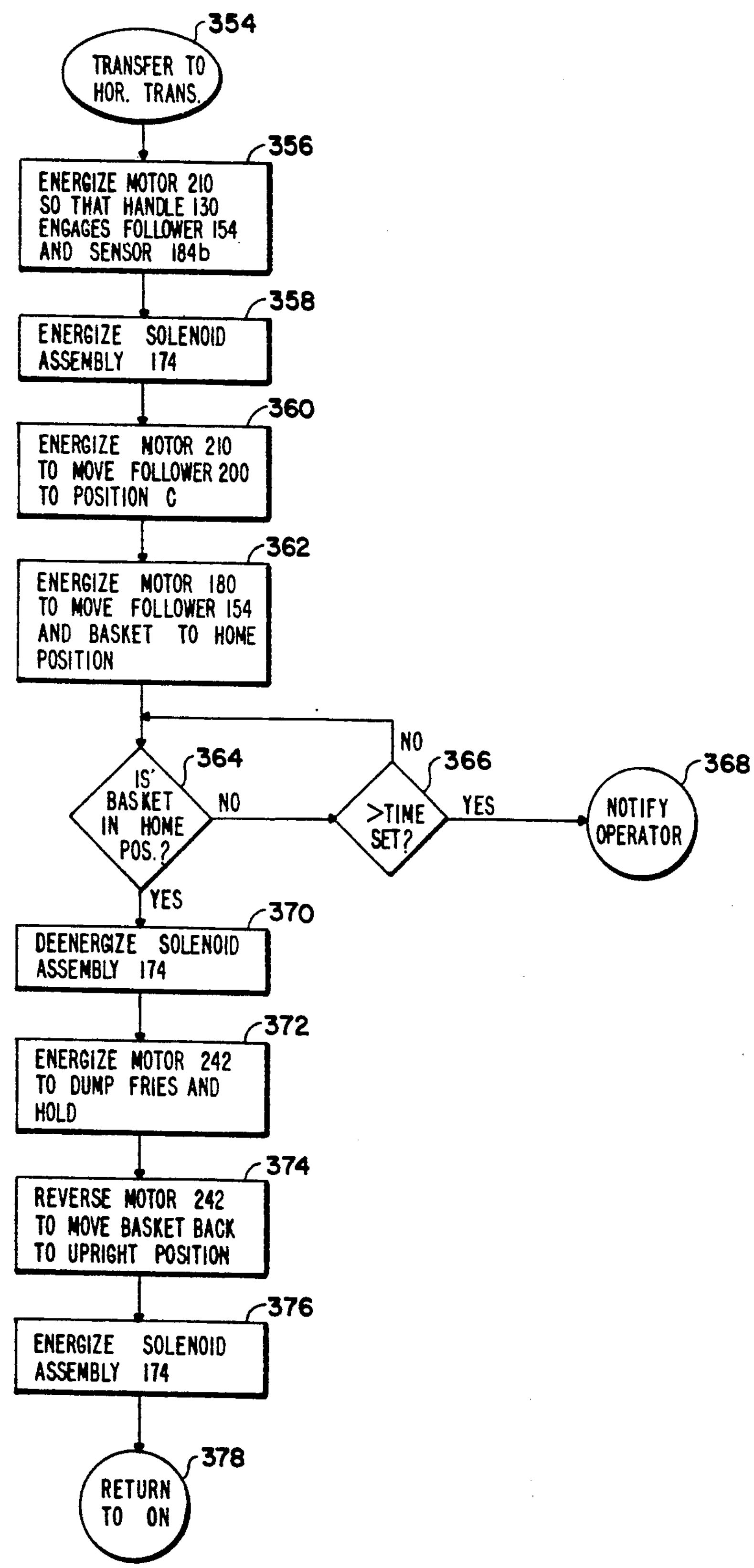

Referring to FIG. 12D, the control next proceeds to step 356 and the motor 210 is energized so that handle 130 moves through the slot 166 of the follower 154, and when correctly positioned as indicated by the corresponding sensor 184*b*, the solenoid assembly 174 is then energized at step 358 so as to lock the basket to the horizontal transport assembly 30. At step 360 the appropriate motor 210 is energized so as to move the follower 200 of the vertical transport assembly back to the C position as determined by the shaft encoder 211. The motor 180 is then energized so as to move the follower 154 and supported basket to the home position as indicated at step 362. Motor 180 should automatically be de-energized when the basket is correctly positioned in the harness. At step 364 the inquiry is made whether the basket is at the home position by interrogating the sensor 184*a*. If no, the control proceeds to step 366 to compare the time elapsed for moving the basket to the home position to some predetermined set amount of time so that if the time is exceeded the control will notify the operator at step 368. If the time is not exceeded at step 366, the control will repeat steps 364 and 366 until the basket is indicated by the sensor 184a that the basket is at the correct position in the harness 220, or the preset time limit is exceeded. Once the basket is at the correct position before the expiration of the time limit, the control proceeds to step 370 so that the control 250 will de-energize the solenoid assembly 174. The motor 242 is then energized for dumping the fries onto the holding station 40 as indicated at step 372. As previously indicated, since the solenoid assembly has been de-energized, the handle 130 of the basket will freely rotate out of the slot 166 as the harness rotates. Once the fries are dumped, motor 242 is reversed, as is indicated at step 374, so as to move the basket to the upright position as indicated at step 374. The solenoid assembly 174 is then energized at step 376 so as to secure the basket to the horizontal transport assembly. The control then turns to step 378 by returning to the ON condition at 260, shown in FIG. 12A.

It should be appreciated that the system described in connection with FIGS. 11 and 12A–12D can be a simultaneous processing system so that the state of the system can accommodate additional orders as they are entered at step 262, even though previous orders are being processed.

The system 10 thus described fully automates the frying operation of food products, such as french fried potatoes. The system is fully automated with a minimum labor effort regarding the storage and cooking operations of the food products. By maintaining the frozen potatoes in a controlled storage environment and loading the potatoes into each basket so that the strips are all oriented in substantially the same direction (within 30° of one another) the french fries will cook so that they will not be as likely to stick together without the need to shake the potatoes during and following the cooking operation. By controlling the frying operation in response to orders, the automated frying system 10 is capable of operating based on point of sales information and daily business cycles.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. An automated fryer system for frying food in predetermined incremental amounts, said system comprising:

means for defining a loading station;

a plurality of frying means, each for independently frying said food in oil in said predetermined incremental amount;

horizontal transport means for transporting said food in said predetermined incremental amounts from said loading station to any one of a plurality of transfer positions, wherein the plurality of transfer positions are respectively located directly above the plurality of said frying means;

a plurality of independently operable vertical transport means, at least one for each of said frying means, each for selectively transporting said predetermined incremental amount of food up and down among a corresponding first position wherein said predetermined incremental amount of food is transferable between said horizontal and said vertical transport means at said corresponding transfer and first positions, a corresponding second position wherein said predetermined incremental amount of food is lowered to the respective frying means so that said predetermined incremental amount of food will fry in said oil, and a corresponding third position wherein said predetermined incremental amount of food is positioned above said respective frying means so as to allow oil to drip into said respective frying means after said predetermined incremental amount of food has been fried in said oil; and means for selecting one of said vertical transport means for transporting said predetermined incremental amount of food up and down among said corresponding first, second and third positions.

2. An automated fryer system for frying foods in oil, said system comprising:

container means, including at least one frying container, for holding a predetermined amount of food when frying said food in said oil;

means for defining a loading station where food is loaded into each said container;

means, defining a frying station, for receiving at least two independent fryer means for frying said foods in oil;

horizontal transport means for transporting each said container from said loading station to a position above said frying station;

vertical transport means for each of said frying means and independently operable from said horizontal means, for transporting each said container up and down among a first position wherein said container is transferable between said horizontal and the corresponding vertical transport means, a second position wherein said container is lowered to said frying station so that food in said container will fry in said oil in the corresponding frying means, and a third position wherein said container is positioned above said frying station so as to allow oil to drip into said fryer station after food in said container has been fried in said oil;

engagement means for releasably securing each said container to each of said horizontal and vertical transport means so that each said container can be transferred therebetween; and means for selecting the vertical transport means to which said container is transferred from said horizontal transport.

3. A system according to claim 2, wherein said container includes a handle, and said engagement means includes means provided on each of said horizontal and vertical transport means for releasably locking said handle to each said transport means.

4. A system according to claim 3, wherein said handle includes an aperture, and said means provided on said horizontal transport means for releasably locking said handle to said horizontal transport means includes restraining means for restraining said handle in the horizontal direction and means, including a reciprocal element movable into and out of said aperture, for securing said handle in said restraining means.

5. A system according to claim 4, wherein said restraining means includes a slot for receiving said handle as said container is moved in a vertical direction by said vertical transport means.

6. A system according to claim 4, wherein said means for securing said handle in said restraining means includes a selectively operable solenoid assembly.

7. A system according to claim 3, wherein said means provided on each said vertical transport means for releasably locking said handle to said vertical transport means includes handle cooperation means provided on said vertical transport means and selectively movable so as to move said container to each of said first, second and third positions, wherein said handle cooperation means includes means for cooperating with said handle when said container is locked to said horizontal transport means in said first position and means for releasably locking said container to said vertical transport means prior to the release of said container from said horizontal transport means.

8. A system according to claim 7, wherein said handle cooperation means includes a latch for gripping and supporting said handle as said latch is moved upwardly toward said first position of said container.

9. A system according to claim 8, wherein said latch includes a pair of fingers and said handle includes a neck section sized to slide through said fingers and a tab section sized so as to be vertically restrained by said fingers by the weight of said container.

10. A system according to claim 2, further including refrigeration storage means for storing said food until said food is to be fired, and means for transferring food from said storage means to said loading station, and means, positioned at said loading station, for feeding food into said container.

11. A system according to claim 10, wherein said means for feeding food into said container feeds said food into said container so as to substantially prevent said food from sticking together as it fries in said oil.

12. A system according to claim 11, wherein said food are strips of potatoes and said means for feeding food into said container includes means for loading said strips into said container so that the elongated direction of all said strips of potatoes in the container are oriented so as to be parallel or substantially parallel with each other.

13. A system according to claim 12, wherein said means for loading said strips into said container includes means for loading said potatoes so that the elongated direction of all of said potatoes in said container are oriented with respect to one another within a predetermined angle no greater than about 30°.

14. A system according to claim 10, wherein said food are strips of potatoes and said refrigeration storage means includes means for maintaining said strips of potatoes so as to prevent said potatoes from sticking together.

15. A system according to claim 10, wherein said refrigeration storage means maintains said food in a frozen state and said system further includes means for thawing said food prior to frying.

16. A system according to claim 15, wherein said means for thawing said food prior to frying includes means, positioned at said loading station, for thawing said food.

17. A system according to claim 16, wherein said means for thawing said food includes means for blowing relatively hot, dry air on said food prior to loading food into each said container.

18. A system according to claim 2, wherein said horizontal transport means includes a lead screw, a lead screw follower and means, secured to said lead screw follower, for engaging said container.

19. A system according to claim 18, wherein said horizontal transport means includes means for determining the location of said lead screw follower on said lead screw so as to determine the location of said container relative to said loading station and said frying station.

20. A system according to claim 19, wherein said means for determining the location of said lead screw follower includes means for monitoring the number and direction of revolutions of said lead screw about its axis relative to a predetermined angular reference position.

21. A system according to claim 20, wherein said means for monitoring includes a shaft encoder.

22. A system according to claim 18, wherein said follower is movable on said lead screw and said horizontal transport means further includes a guide rod disposed parallel to said lead screw and cooperative with said lead screw follower so as to (a) maintain said lead screw follower in a predetermined orientation as said follower moves on said lead screw and (b) maintain a container secured to said engagement means in a horizontal orientation.

23. An automated fryer system for frying foods in oil, said system comprising:

- a frying station including a plurality of independent fryers for frying a predetermined incremental amount of food in any one of a plurality of independent cooking vats of said oil;
- a plurality of frying baskets, each sized to contain said predetermined incremental amount of food for frying said predetermined incremental amount of food at a corresponding one of said cooking vats;
- a horizontal transport for transporting each of said baskets, among (a) a loading position wherein each of said predetermined incremental amounts of food are loaded onto said horizontal transport, (b) any one of a plurality of first positions, each respectively located above a corresponding one of said plurality of cooking vats, and (c) an unloading position wherein each of said predetermined incremental amounts of food are unloaded from said horizontal transport into the corresponding one of said plurality of cooking vats; and
- a plurality of vertical transports each for independently moving each of said baskets up and down between a corresponding one of said plurality of first positions, wherein said basket is transferred between the horizontal and the respective vertical transport, and to and form a corresponding cooking vat so that predetermined incremental amounts of food can be independently fried in said corresponding cooking vat and drained from a position above said cooking vat following such frying; and
- means for selectively determining which of said vertical transports is used to move each said basket up and down.

* * * * *

UNITED STATES PATENT AND TRADEMARK OFFICE
CERTIFICATE OF CORRECTION

PATENT NO. : 5,142,968

DATED : September 1, 1992

INVENTOR(S) : Richard N. Caron, David H. McFadden, John M. Collins, and John Dieckmann

It is certified that error appears in the above-identified patent and that said Letters Patent is hereby corrected as shown below:

Claim 10, column 19, line 26, delete "fired" and substitute therefor -- fried --;

Claim 23, column 20, line 55, delete "form" and substitute therefor -- from --.

Signed and Sealed this

Twelfth Day of October, 1993

*Attest:*

BRUCE LEHMAN

*Attesting Officer*

*Commissioner of Patents and Trademarks*